US008268227B2

(12) United States Patent
Chen et al.

(10) Patent No.: US 8,268,227 B2
(45) Date of Patent: Sep. 18, 2012

(54) METHOD FOR FORMING OPTICAL COMPENSATING FILMS, OPTICAL COMPENSATING FILMS FORMED THEREBY, STRUCTURE OF OPTICAL COMPENSATING FILMS, AND POLARIZING PLATES

(75) Inventors: Chih-Kuang Chen, Taipei (TW); Shih-Ming Chen, Hsinchu (TW); Kun-Tsung Lu, Bade (TW); Jia-Chih Huang, Jhubei (TW); Li-Ching Wang, Jhongli (TW)

(73) Assignee: Industrial Technology Research Institute, Hsinchu County (TW)

( * ) Notice: Subject to any disclaimer, the term of this patent is extended or adjusted under 35 U.S.C. 154(b) by 955 days.

(21) Appl. No.: 12/241,324

(22) Filed: Sep. 30, 2008

(65) Prior Publication Data

US 2009/0167993 A1 Jul. 2, 2009

(30) Foreign Application Priority Data

Dec. 31, 2007 (TW) ................................ 96151447 A
May 9, 2008 (TW) ................................ 97117143 A

(51) Int. Cl.
 *B29C 35/10* (2006.01)
(52) U.S. Cl. ........................... 264/494; 264/495; 522/79
(58) Field of Classification Search .................. 264/494, 264/495; 522/79
See application file for complete search history.

(56) References Cited

U.S. PATENT DOCUMENTS

| 5,430,566 | A | 7/1995 | Sakaya et al. |
| 6,937,310 | B2 | 8/2005 | Elman et al. |
| 7,123,328 | B2 | 10/2006 | Sasaki et al. |
| 7,329,439 | B2* | 2/2008 | Sachdev et al. ............... 427/517 |
| 2004/0233526 | A1* | 11/2004 | Kaminsky et al. ............ 359/452 |

(Continued)

FOREIGN PATENT DOCUMENTS

EP 0816900 A2 1/1998

(Continued)

OTHER PUBLICATIONS

Examination opinion issued by the Taiwan Intellectual Property Office on Mar. 28, 2012, for the above-referenced application's counterpart application in Taiwan (Application No. 097117143 filed May 9, 2008).

*Primary Examiner* — Joseph Del Sole
*Assistant Examiner* — James Sanders
(74) *Attorney, Agent, or Firm* — Pai Patent & Trademark Law Firm; Chao-Chang David Pai

(57) ABSTRACT

The invention provides a method for forming optical compensating films, including: (a) providing a suspension containing clay; (b) adding a mono-functional acrylic oligomer of formula (I) in the suspension, wherein $n_1$ is 2-25, $R_1$ is $C_{1-10}$ alkyl or H and $R_2$ is H or $CH_3$; (c) adding a water-soluble polymer in the suspension; (d) adding a bi-functional acrylic oligomer of formula (II) in the suspension, wherein $n_2$ is 3-50, and $R_3$ and $R_4$ independently are H or $CH_3$; (e) after the step (d), drying the suspension to form a film; (f) exposing the film under UV light to cure the film; and (g) stretching the film, wherein the film has only a negative C-plate property before the stretching and has both negative C-plate and positive A-plate properties after the stretching.

16 Claims, 8 Drawing Sheets

U.S. PATENT DOCUMENTS

| | | | |
|---|---|---|---|
| 2005/0030456 A1 | 2/2005 | Murakami et al. | |
| 2005/0070655 A1* | 3/2005 | Van Den Bergen et al. | 524/445 |
| 2005/0231809 A1* | 10/2005 | Carlson et al. | 359/619 |
| 2005/0266239 A1 | 12/2005 | Satake et al. | |
| 2006/0292314 A1 | 12/2006 | Yamada et al. | |
| 2007/0046870 A1 | 3/2007 | Murakami et al. | |
| 2007/0059456 A1 | 3/2007 | Lee et al. | |
| 2008/0193751 A1* | 8/2008 | Groppel | 428/355 EP |

FOREIGN PATENT DOCUMENTS

| | | |
|---|---|---|
| EP | 1780562 A1 | 5/2007 |
| JP | 10-104428 A | 4/1998 |
| JP | 2003344657 A | 12/2003 |
| JP | 2004004474 A | 1/2004 |
| JP | 2004317812 A | 11/2004 |
| JP | 2005031557 A | 2/2005 |
| JP | 2005115281 A | 4/2005 |
| JP | 2006-58540 A | 3/2006 |
| JP | 2006091035 A | 4/2006 |
| JP | 2006-521570 A | 9/2006 |
| JP | 2006293331 A | 10/2006 |
| JP | 2006313214 A | 11/2006 |
| TW | 261711 B | 9/2006 |
| TW | I290651 | 12/2007 |

* cited by examiner

METHOD FOR FORMING OPTICAL COMPENSATING FILMS, OPTICAL COMPENSATING FILMS FORMED THEREBY, STRUCTURE OF OPTICAL COMPENSATING FILMS, AND POLARIZING PLATES

CROSS REFERENCE TO RELATED APPLICATIONS

This Application claims priority of Taiwan Patent Application No. 096151447, filed on Dec. 31, 2007 and Taiwan Patent Application No. 097117143 filed on May 9, 2008, the entirety of which is incorporated by reference herein.

BACKGROUND OF THE INVENTION

Field of the Invention

The present invention relates to flat panel display technology, and in particular relates to a method for forming an optical compensating film.

DESCRIPTION OF THE RELATED ART

Flat panel displays are light, thin, and small and portable easily, therefore they are used instead of traditional CRT technology and are applied to many products such as the liquid crystal displays of calculators, cell phones, computers and notebook computers. The general principle of the liquid crystal displays, is to drive the rod shaped liquid crystal molecules by an electric field to reach brightness control. However, because liquid crystal molecules have a birefringence, limitation of viewing angle and dark-state light leakage may occur. One acceptable solution without need to change the mode and preparation process of the flat panel display, is to provide an optical compensating film on the panel display. However, the birefringence, light transparency and dimensional uniformity of the optical compensating film must be carefully controlled to increase the viewing angle.

Optical compensating films are chosen based on the type of flat panel display technology. At present, the main flat panel display technologies comprise in-plane switching (IPS) mode, vertical alignment (VA) mode and optical compensated bend (OCB) mode. Types of optical compensating films include a uniaxial form of an A-plate and a C-plate type. The optical axis of the A-plate is parallel to the film and the A-plate has the refractive index ny=nz≠nx. The optical axis of the C-plate is vertical to the film and the C-plate has the refractive index ny=nx≠nz. In addition, there is a biaxial form of an O-plate and the O-plate has the refractive index ny≠nx≠nz. To prevent dark-state light leakage occurring at any viewing angle, combining the A-plate and the C-plate type in liquid crystal displays is presently the most popular method used.

BRIEF SUMMARY OF THE INVENTION

The invention provides a method for forming optical compensating films, comprising: (a) providing a suspension containing clay, wherein the particle size of the clay is about a diameter of 1-100 nm and about a thickness of 0.1-10 nm; (b) adding a mono-functional acrylic oligomer of formula (I) in the suspension, wherein $n_1$ is 2-25, $R_1$ is $C_{1-10}$ alkyl or H and $R_2$ is H or $CH_3$;

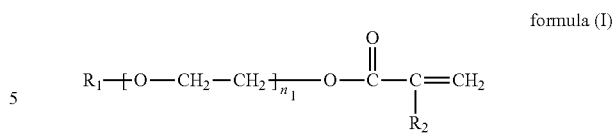

formula (I)

(c) adding a water-soluble polymer in the suspension; (d) adding a bi-functional acrylic oligomer of formula (II) in the suspension, wherein, $n_2$ is 3-50, $R_3$ and $R_4$ independently are H or $CH_3$;

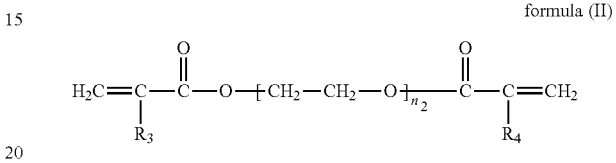

formula (II)

(e) after the step (d), drying the suspension to form a film; (f) exposing the film under UV light to cure the film, wherein the UV light exposing condition comprises using UV light of 200-450 nm, single exposure of UV light energy of 1-10 J/cm², exposing rate of 1-2 m/min, and exposing two sides of the film under UV light for 1-3 times; and (g) stretching the film, wherein the film has only a negative C-plate property before the stretching and has both negative C-plate and positive A-plate properties after the stretching.

The invention also provides an optical compensating film formed by the method mentioned above.

The invention also provides an optical compensating film structure formed by stacking a plurality of the clay layers in a direction parallel to a surface of the optical compensating film, wherein the clay layers have a water-soluble polymer as an adhesive agent between them and a difference of the refractive index is about 0.005-0.03.

The invention further provides a polarizing plate having a compensating function, comprising: a polarizer having a first side and a second side; an optical compensating film mentioned above disposed at the first side; and a first passivation layer disposed at the second side. A detailed description is given in the following embodiments with reference to the accompanying drawings.

BRIEF DESCRIPTION OF THE DRAWINGS

The present invention can be more thoroughly understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention uses clay/polymer composite film as a structure for an optical compensating film. By utilizing the orientation feature of the disk-like clay in the polymers, the composite film material has features of birefringence or optical retardation. Then, the disk-like clay will stack layer by layer to form a secondary structure also called the grain structure. Besides, a mono-functional acrylic oligomer was introduced at interface between secondary structures. Therefore, the film has excellent elongation ability and flexibility. After stretching uniaxially, the clay film may have both a negative C-plate and a positive A-plate feature (nx >ny >nz) as a result.

In the invention, first, the surface of the clay adheres to a lubricant (a mono-functional acrylic oligomer containing ethylene oxide chain). After an adhesive agent (water-soluble polymer) intercalates between the clay layers, the lubricant will desorb from the clay surface. Then the lubricant will be pushed out to the surrounding of the clay aggregation. Introduction of the lubricant increases the elongation ability and flexibility of the clay film and allows the film to contain high content of the clay without cracks. A bi-functional acrylic oligomer containing ethylene oxide block is introduced into the surroundings of the clay aggregation and forms a crosslink structure between the clay aggregations to increase water-resistance. In addition, after addition of the lubricant, a surfactant may be optionally added as a softening agent. The surfactant belongs to one type of copolymer, which can form micelle structure to increase softening ability of the clay composite material.

Figure 1:
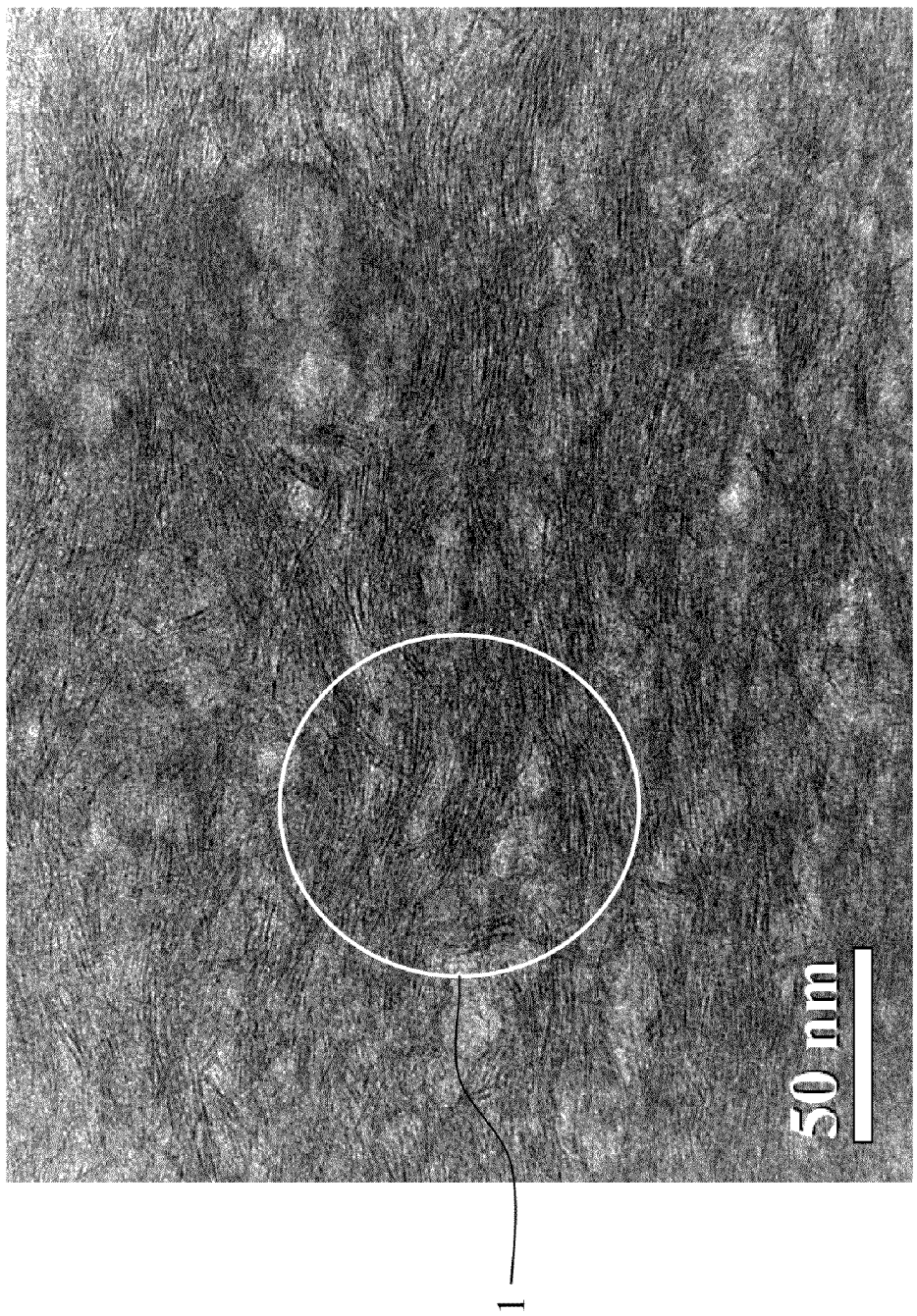
FIG. 1 is a scanning electron microscope (SEM) image of the clay composite material of the invention.

In one embodiment, the size of a single clay aggregation or grain is a diameter of about 2-4 μm and a thickness of about 0.3-0.5 μm. The scanning electron microscope (SEM) image of the clay composite material of the invention is shown in FIG. 1. FIG. 1 shows a single clay aggregation composed by discrete disc-like clay particles with a diameter of about 1-100 nm and a thickness of about 0.1-10 nm, preferably, with a diameter of about 30 nm and a thickness of about 1 nm. The single clay aggregation has good oriented arrangement 1 and is composed by stacking 3000-9000 pieces of disk-like clay. A diameter of the single clay aggregation is determined by the length of molecular chain of the adhesive agent. A lubricant and copolymer with micelle structure fills in defects between the clay aggregations to release the microscopic stress caused by the defects. After the UV exposure on the composite film, the lubricant can form linear structure. This linear structure and micelle structure formed by copolymer rendered the composite film excellent flexibility and stretchable ability. By utilizing this feature, after the film is stretched, the clay has better orientation in the composite material.

The method for forming an optical compensating film is illustrated in the following. First, a clay and water are mixed together as a suspension and the weight fraction of the clay in the suspension is about 4-10%, preferably about 10%. The clay may comprise laponite, mica, vermiculite, montmorillonite, bentonite, saponite or hectorite. In one embodiment, the clay comprises laponite.

Then, a mono-functional acrylic oligomer (lubricant) is added into the suspension where the lubricant adsorbed on the clay surface. The structure of the mono-functional acrylic oligomer is shown as formula (I), wherein $n_1$ is an integer 2-25, preferably 2-5, $R_1$ is $C_{1-10}$ alkyl or H, preferably $R_1$ is $C_{1-5}$ alkyl or H, and $R_2$ is H or $CH_3$.

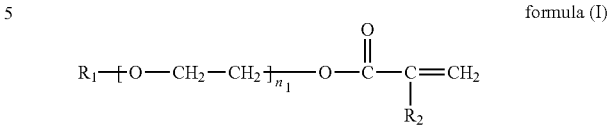

formula (I)

The molecular weight of the mono-functional acrylic oligomer mentioned above is about 100-1000, preferably, about 150-250. In one embodiment, $n_1$ is 2, $R_1$ is $C_2H_5$, and $R_2$ is H, and the compound is EOEOEA.

After the mono-functional acrylic oligomer is added into the suspension mentioned above, a surfactant of formula (III) is added into the suspension as a softening agent, wherein $n_3$ is 1-200, preferably 70-100, and $n_4$ is 1-100, preferably 20-40.

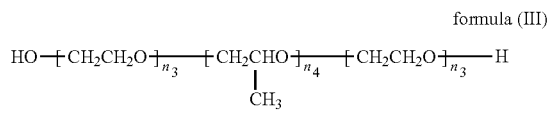

formula (III)

The molecular weight of the surfactant mentioned above is about 2000-15000, preferably about 7680-9510. In one embodiment, $n_3$ is 80 and $n_4$ is 27, and the compound is Pluronic F-68 (BASF).

Next, a water-soluble polymer is added into the suspension as an adhesive agent. The water-soluble polymer may comprise polyethylene oxide (PEO), polyvinyl alcohol (PVA), polyacrylic acid (PAA), polyvinyl pyrrolidone (PVP), water-solubility starch, hydroxypropyl methyl cellulose (HPMC) or chitosan. In one embodiment, the water-soluble polymer is polyethylene oxide. The molecular weight of polyethylene oxide is about 100000-5000000, preferably, about 800000-1000000.

Then a bi-functional acrylic oligomer is added into the suspension as a crosslink agent. The structure of the mono-functional acrylic oligomer is shown as formula (II), wherein $n_2$ is an integer 3-50, preferably 20-30, $R_3$ and $R_4$ are H or $CH_3$.

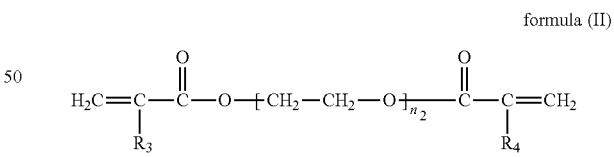

formula (II)

The molecular weight of the bi-functional acrylic oligomer mentioned above is about 200-2500, preferably, about 1100-1200. In one embodiment, $n_2$ is 23, $R_3$ and $R_4$ are $CH_3$, and the compound is EGMA23.

In addition, a photoinitiator may be optionally added into the suspension during the step of adding the bi-functional acrylic oligomer into the suspension. The photoinitiator is present at about 1/10 of the total mount of the mono-functional acrylic oligomer of formula (I) and the bi-functional acrylic oligomer of formula (II).

Then the suspension is dried into a film. For example, the suspension mentioned above is applied on a substrate to be dried into a film. In one embodiment, the drying may use 30-50° C. hot air to dry the film for 6-10 hours, preferably, 40° C. of hot air to dry the film for 8 hours. The substrate comprises a nano epoxy resin/SiO2 mixture material film, the commercial material named Afton, polyethylene terephthalate (PET), polycarbonate (PC), ZEONOR®, steel plate or glass plate. The applying step may comprise applying the suspension on a substrate by using a scraper.

Then the dried film is cured by UV light exposure. The UV light exposing condition comprises using UV light of 200-450 nm, preferably 370 nm, single exposure of UV light energy of 1-10 J/cm$^2$, preferably 3 J/cm$^2$, exposing rate of 1-2 m/min, preferably 2 m/min, and exposing two sides of the film under UV light for 1-3 times, preferably 2 times. After exposing the film under UV light, the film is stretched to form a film of the invention. Before being stretched, the film only has the optical feature of a negative C-plate. However, after being stretched, the film has the optical feature of a negative C-plate and a positive A-plate at the same time. During the stretching step mentioned above, the film is stretched in a uniaxial direction. The direction is parallel to the arrangement of molecules in the film. The original thickness of the film is about 80-150 μm. The stretching may be performed at 25-100° C.

Before the stretching, the Rth value of per μm thickness of the film is greater than 5 and an elongation rate of the film is about 10-100%. During the stretching, the out-of-plane Rth value of per μm thickness of the film and the in-of-plane Ro value of the film increases with an elongation ratio.

The amounts of the clay, water-soluble polymer, mono-functional acrylic oligomer of formula (I), surfactant (if any) and bi-functional acrylic oligomer of formula (II), are about 40-75 parts by weight, about 15-45 parts by weight, about 1-10 parts by weight, about 0.5-2.5 parts by weight and about 10-45 parts by weight, respectively, and preferably about 55 parts by weight, about 29 parts by weight, about 2 parts by weight, about 0.9 parts by weight and about 14 parts by weight, respectively.

Figure 2:
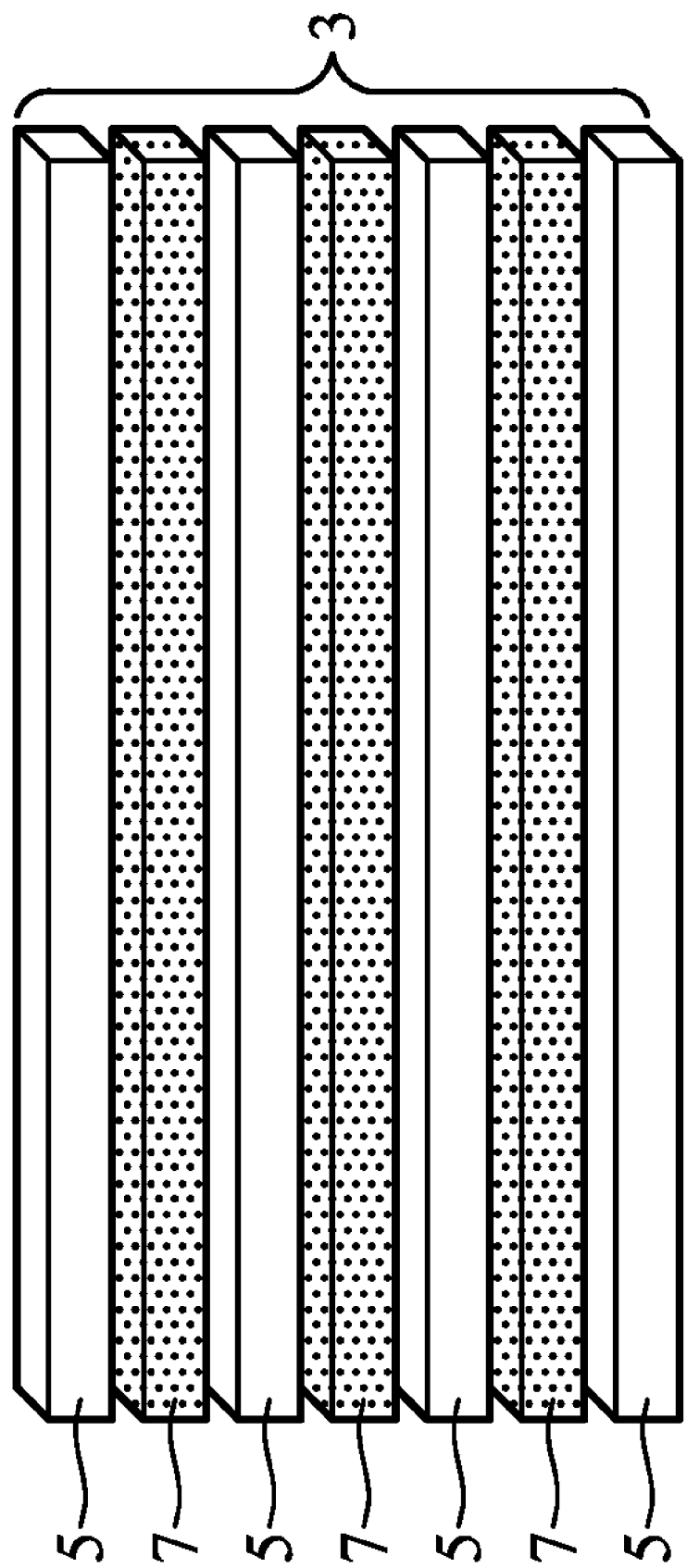
FIG. 2 shows an optical compensating film structure.

FIG. 2 shows an optical compensating film structure, and the structure is formed by stacking a plurality of the clay layers 5 in a direction parallel to a surface of the optical compensating film 3, wherein a water-soluble polymer 7 is disposed between the clay layers as an adhesive agent and a difference of the refractive index is about 0.005-0.03. The alternation of the inorganic material (clay) and the organic material (water-soluble polymer) and the difference of the refractive index between the inorganic material and the organic material allow the optical compensating film structure to have birefringence property. In one embodiment, the clay is a laponite, the water-soluble polymer is a polyethylene oxide and the difference of the refractive index between the laponite and the polyethylene oxide is about 0.01. Because the clay layers are applied with directional elongation stress, they are arranged in a direction parallel to the surface of the film. The clay layers have excellent parallel arrangement structure, therefore the optical compensating film of the invention has the Rth value in a thickness direction and the Ro value parallel to the surface direction at the same time.

Figure 3B:
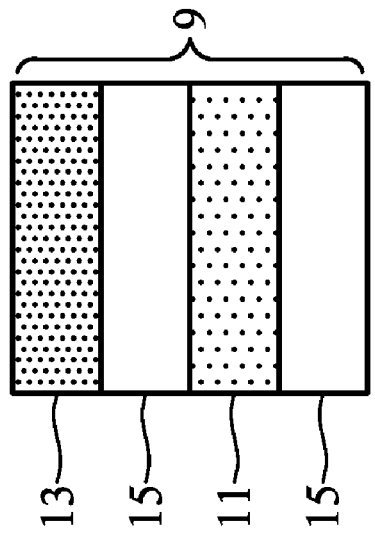
FIGS. 3A and B show examples of the optical compensating film of the invention applied in a polarizing plate.
Figure 3A:
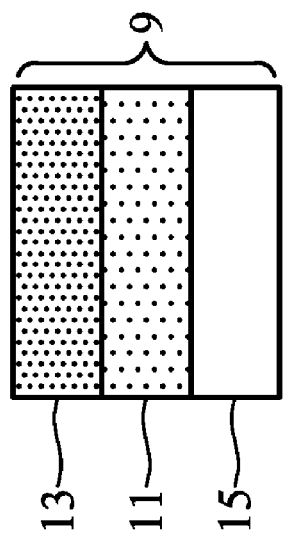

The optical compensating film of the invention may be applied in a polarizing plate. In one embodiment, as shown in FIG. 3A, a polarizing plate 9 comprises a polarizer 11 having a first side and a second side. Furthermore, an optical compensating film 13 of the invention is disposed at the first side and a passivation layer 15 is disposed at the second side. In another embodiment, as shown in FIG. 3B, another passivation layer 15 may be disposed between polarizer 11 and optical compensating film 13. The material of the polarizer 11 may comprise a polyvinyl alcohol and the material of the passivation layer 15 may comprise a cellulose triacetate or a nano epoxy resin/SiO$_2$ hybrid material.

Figure 4B:
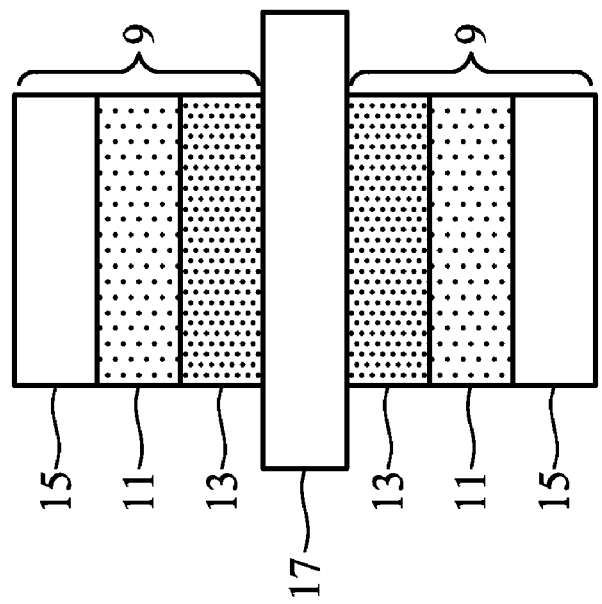
FIGS. 4A-E show possible ways in which the polarizing plate can combine with a liquid crystal cell.
Figure 4A:
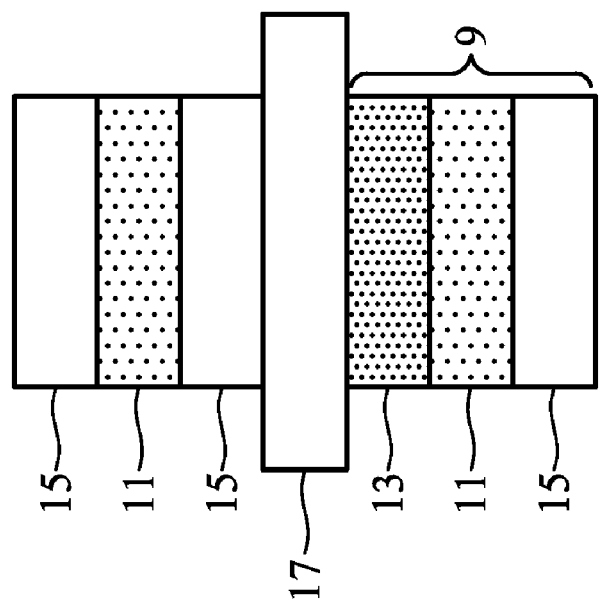
Figure 4E:
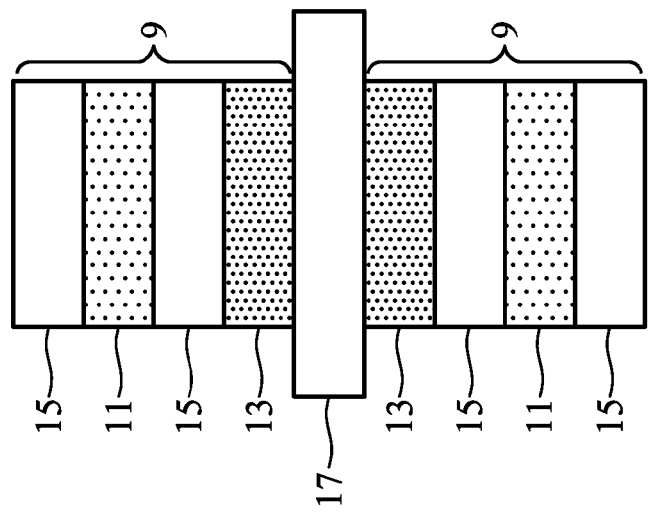
Figure 4D:
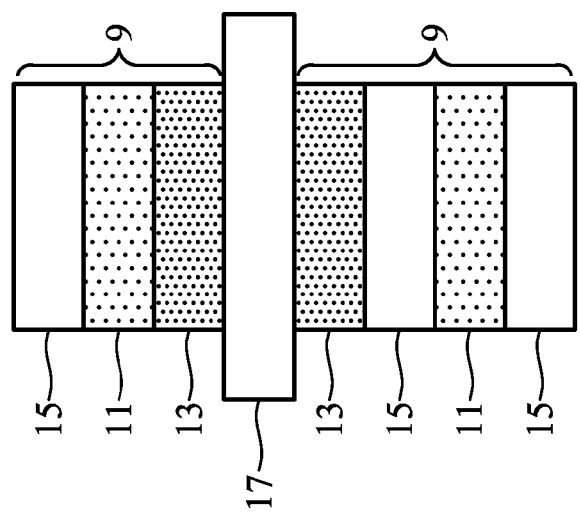
Figure 4C:
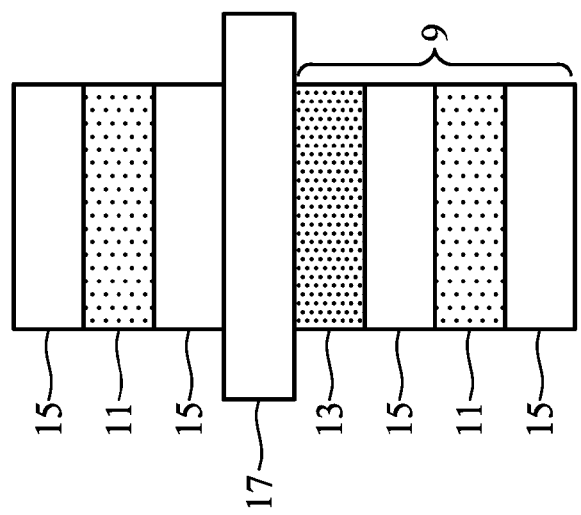

In addition, the polarizing plate containing the optical compensating film of the invention may be combined with a liquid crystal cell in many ways. The possible ways in which the polarizing plate can combine with a liquid crystal cell are shown in FIG. 4A-E. FIGS. 4A-E shows that the polarizing plate 9 is at least at one side of the liquid crystal cell 17 and the optical compensating film 13 of the polarizing plate 9 adjoins the liquid crystal cell 17. FIG. 4A shows that the polarizing plate 9 is only at one side of the liquid crystal cell 17, the polarizing plate 9 only has one passivation layer 15 at the outermost side thereof and the other side of the liquid crystal cell 17 has a passivation layer 15 and a polarizer 11. FIG. 4B shows that the two sides of the liquid crystal cell 17 both have a polarizing plate 9 and the two polarizing plates 9 both have one passivation layer 15 at the outermost side thereof. FIG. 4C shows that polarizing plate 9 is only at one side of the liquid crystal cell 17 and the polarizing plate 9 has one more passivation layer 15 between the optical compensating film 13 and the polarizer 11. FIG. 4D shows that the two sides of the liquid crystal cell 17 both have polarizing plates 9, and one of the polarizing plate 9 only has one passivation layer 15, and the other polarizing plate 9 has one more passivation layer 15 between the optical compensating film 13 and the polarizer 11. FIG. 4E shows that the two sides of the liquid crystal cell 17 both have polarizing plates 9 and the two polarizing plates 9 both have another passivation layer 15 between the optical compensating film 13 and the polarizer 11.

EXAMPLE

Example 1

36 g of laponite was added into 564 g of water to form a suspension. After the laponite was completely dispersed, 1.2 g of mono-functional acrylic oligomer, EOEOEA

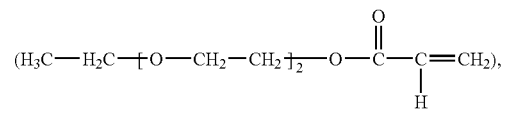

was added in the suspension, stirred for 2 hours, and the mono-functional acrylic oligomer was allowed to adhere on the surface of the clay. Then, 18.43 g of polyethylene oxide

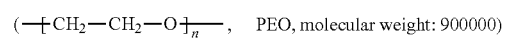

was added. After the PEO intercalated between the clay layers, 9.21 g of bi-functional acrylic oligomer, EGMA23

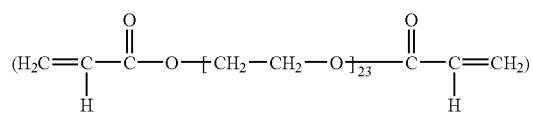

was added. Finally 1.041 g of photoinitiator (73W, Double Bond Chemical, Taiwan) was added. Then, the coating solution has been prepared completely. The formulation of the suspension is shown in Table 1. The suspension was applied on the surface of Arton by using a scraper and dried by hot air set as 40° C. for 8 hours to obtain a dried film. Then, the dried film was cured and crosslinked by UV light. The conditions during the step of exposing the film under UV light were: blow: rate: 2 m/minutes; and exposing the two sides of the film under UV light for two times (Total exposing is four times) (Single exposure of UV light energy of 3 J/cm² energy; Total UV light energy is 12 J/cm²).

After the film was formed, birefringence features of Example 1 of the invention were tested by the phase difference determined apparatus (KOBRA) and the optics features of Example 1 are shown in Table 2. Table 2 shows that Example 1 of the invention had excellent transmittance, almost 0 of Ro value, no A-plate feature, 9.94 nm of Rth/μm and a negative C-plate feature.

TABLE 1

The formulation of Example 1 of the invention

| Clay (parts by weight) | Laponite (g) | water (g) | PEO (g) | EOEOEA (g) | EGMA23 (g) | 73W (g) |
|---|---|---|---|---|---|---|
| 55 | 36 | 564 | 18.43 | 1.2 | 9.21 | 1.041 |

TABLE 2

The optics features of Example 1

| Transmittance (%) | Haze (%) | Rth (nm) | Ro (nm) | Thickness (μm) | Rth/μm |
|---|---|---|---|---|---|
| 92 | 1.1 | 1212 | 0.9 | 122 | 9.94 |

Figure 5B:
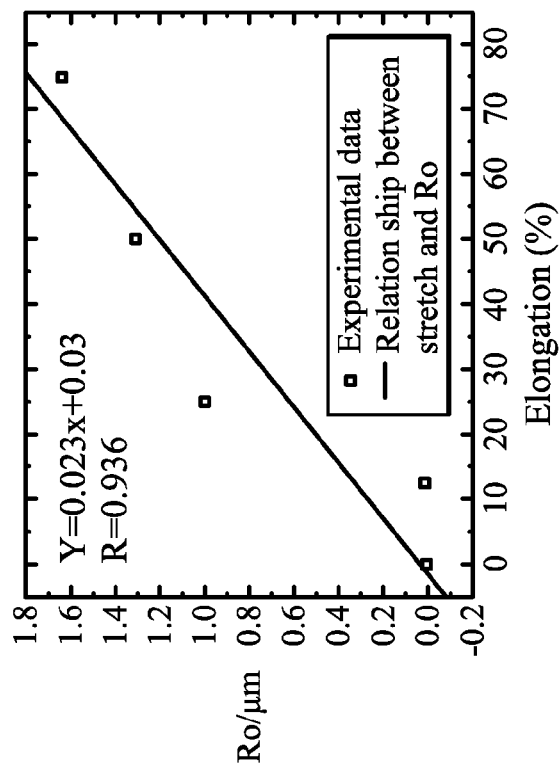
FIG. 5B shows the relationship between an elongation ratio and an Ro/μm.
Figure 5A:
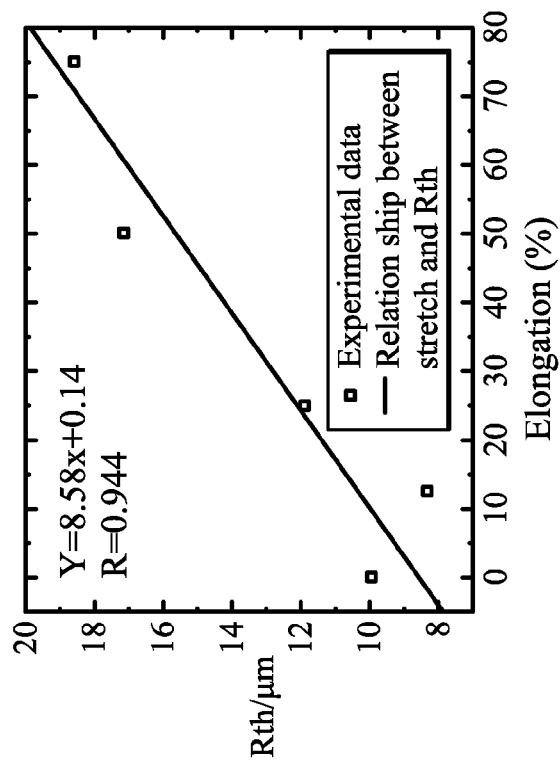
FIG. 5A shows the relationship between an elongation ratio and an Rth/μm.

The optical compensating film having the formulation shown in Table 1 was stretched in a uniaxial direction and the Rth value of the film after being stretched was determined. The results are shown in Table 3. The results show that the stretching allowed the optical compensating film of Example 1 to have a Ro value (A-plate character). When an elongation ratio of the film increased, the Rth /μm and Ro/μm (per micro thickness) values both have a proportional increase. Furthermore, the results as shown in Table 3 were also represented by FIGS. 5A and 5B. FIGS. 5A and 5B show that the relationships of the elongation ratio to the Rth/μm value and the elongation ratio to the Ro/μm value both exhibit linear properties. Therefore, the Rth and Ro values, according to the displayer need, can be precisely controlled by elongation ratio.

Figure 6A:
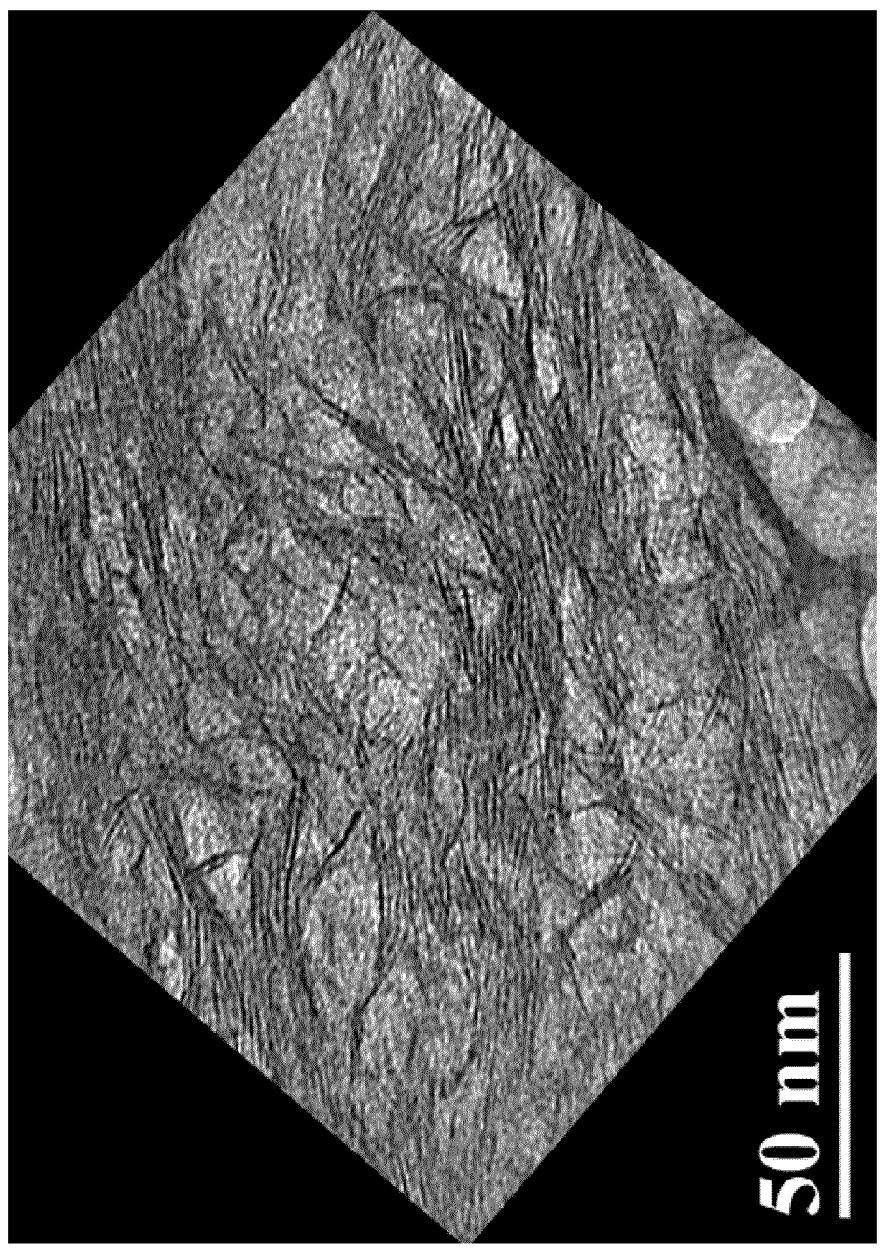
FIG. 6A is a scanning electron microscope (SEM) image of the film of Example 1 before stretching.
Figure 6B:
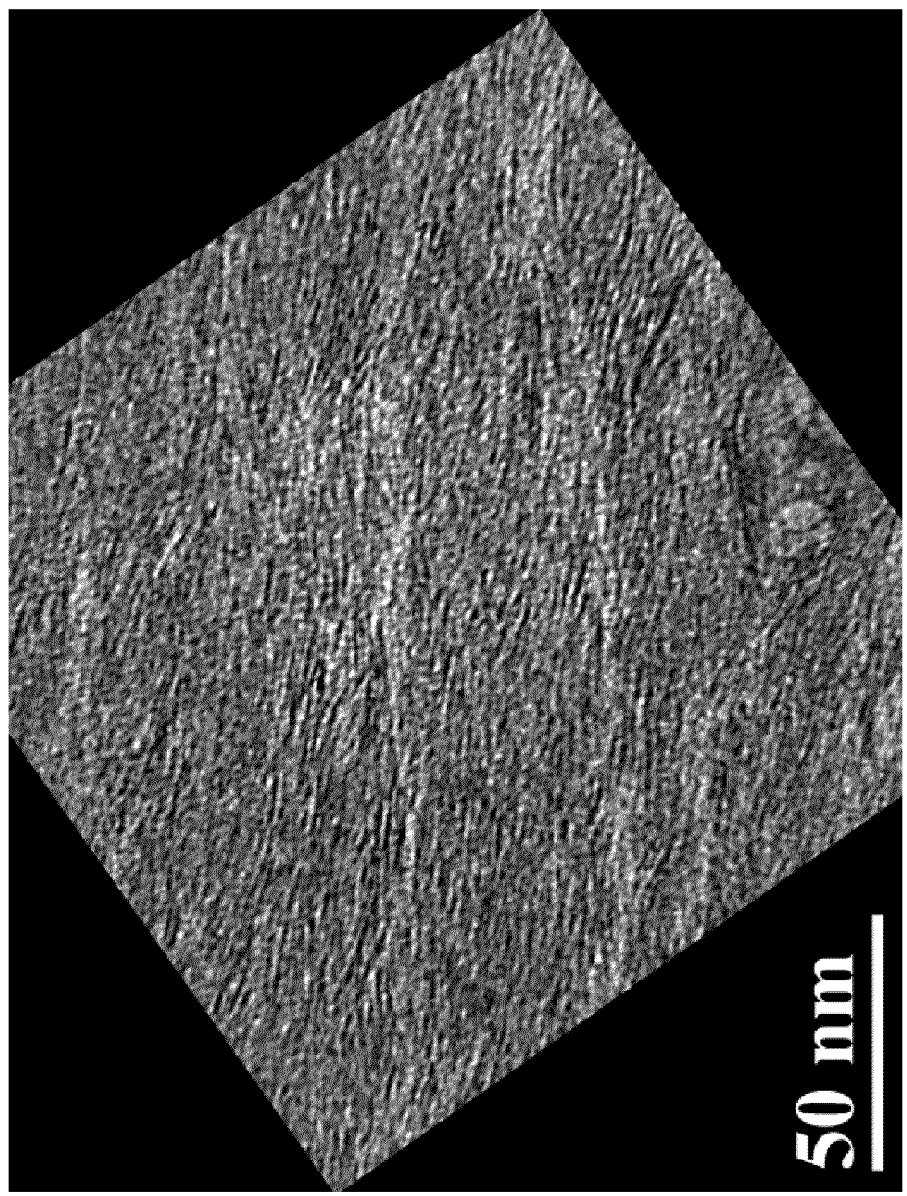
FIG. 6B is a scanning electron microscope (SEM) image of the film of Example 1 after stretching by 75%.

FIG. 6A shows a scanning electron microscope (SEM) image of the film of Example 1 before stretching. In FIG. 6A, before stretching the film structure, the clay layers were not completely aligned in a direction parallel to the surface of the film. FIG. 6B shows a scanning electron microscope (SEM) image of the film of the Example 1 after stretching by 75%. In FIG. 6B, after stretching the film structure, the stress with specified direction was forced on the clay layers, aligning the clay layers to the direction parallel to the surface of the film and therefore the film had a higher out-of-plane Rth value and had an in-of-plane Ro value simultaneously.

TABLE 3

Stretching effect on the birefringence properties of the optical compensating film

| Elongation (%) | Thickness (μm) | Rth (nm) | Ro (nm) | Rth/μm | Ro/μm |
|---|---|---|---|---|---|
| 0 | 122 | 1212 | 0.9 | 9.94 | 0.007 |
| 12.5 | 105 | 870 | 1.3 | 8.29 | 0.012 |
| 25 | 57 | 679.9 | 57.8 | 11.92 | 1 |
| 50 | 37 | 635 | 48.6 | 17.16 | 1.31 |
| 75 | 38 | 707 | 62.5 | 18.6 | 1.64 |

Example 2

The formulation and process for preparing the clay optical compensating film of Example 2 were the same as Example 1. However, formulation of Example 2 had an additional 0.6 g of surfactant (Pluronic F-68) as a softening agent. The film formed by the formulation of Example 2 avoided bubble problem during the drying process. On the other hand, the film formed by the formulation of Example 2 had better flexibility than the Example 1. In addition, when bending at large angle, Example 2 did not break as easily as Example 1. The elongation abilities of Example 1 and Example 2 were the same. Both the films of Example 1 and Example 2 may be stretched at 25° C. Regarding optical features, the film formed by the formulations of Example 1 and Example 2 all have features of nx=ny>nz and intrinsic Rth/μm value about 10 nm before stretching. After stretching, the film formed by the formulations of Example 1 and Example 2 has a feature of nx>ny>nz, and therefore the film formed by the formulations of Example 1 and Example 2 has features of a positive A-plate and a negative C-plate. Table 4 shows the comparison between Example 1 and 2 for process, optics and machinery features.

TABLE 4

The comparison between Example 1 and 2 for process, optical and mechanical features

| | Addition of F-68 | Bubbles remained in the drying process | Flexibility | Elongation | Optical features (before stretching) |
|---|---|---|---|---|---|
| Example 1 | none | few | good | good | nx = ny > nz |
| Example 2 | yes | none | excellent | good | nx = ny > nz |

In traditional technologies, for example the film of US 20050030456, during the stretching process, the operating temperature for the stretching is about 150° C. However, the optical compensating film of the invention may be stretched at 25° C. Therefore the film of the invention may decrease operating temperature for stretching and during stretching, and not need a stretching substrate. Accordingly, the film of the invention may decrease costs.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming optical compensating films, comprising:
   (a) providing a suspension containing clay, wherein the particle size of the clay is a diameter of about 1-100 nm and a thickness of about 0.1-10 nm;
   (b) adding a mono-functional acrylic oligomer of formula (I) in the suspension, wherein $n_1$ is 2-25, $R_1$ is $C_{1-10}$ alkyl or H and $R_2$ is H or $CH_3$;

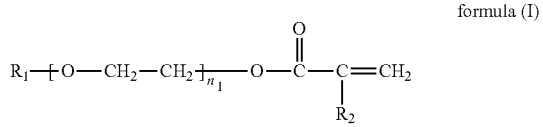

formula (I)

(c) adding a water-soluble polymer in the suspension;
   (d) adding a bi-functional acrylic oligomer of formula (II) in the suspension, wherein, $n_2$ is 3-50, $R_3$ and $R_4$ independently are H or $CH_3$;

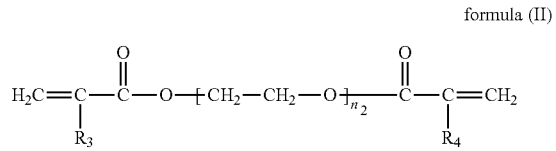

formula (II)

(e) after the step (d), drying the suspension to form a film;
   (f) exposing the film under UV light to cure the film, wherein the UV light exposing condition comprises using UV light of 200-450 nm, single exposure of UV light energy of 1-10 J/cm², exposing rate of 1-2 m/min, and exposing two sides of the film under UV light for 1-3 times; and
   (g) stretching the film, wherein the film has only a negative C-plate property before the stretching and has both negative C-plate and positive A-plate properties after the stretching.

2. The method for forming optical compensating films as claimed in claim 1, wherein step (g) is processed at 20-100° C.

3. The method for forming optical compensating films as claimed in claim 1, wherein the clay is about 40-75 parts by weight, the water-soluble polymer is about 15-45 parts by weight, the mono-functional acrylic oligomer is about 1-10 parts by weight, and the bi-functional acrylic oligomer is about 10-45 parts by weight.

4. The method for forming optical compensating films as claimed in claim 1, wherein the clay comprises laponite, mica, vermiculite, montmorillonite, bentonite, saponite or hectorite.

5. The method for forming optical compensating films as claimed in claim 1, wherein $n_1$ is 2-5, $R_1$ is $C_{1-5}$ alkyl or H and $R_2$ is H or $CH_3$ in the formula (I).

6. The method for forming optical compensating films as claimed in claim 1, wherein $n_1$ is 2, $R_1$ is $C_2H_5$ and $R_2$ is H in the formula (I).

7. The method for forming optical compensating films as claimed in claim 1, wherein the water-soluble polymer comprises polyethylene oxide, polyvinyl alcohol, polyacrylic acid, polyvinyl pyrrolidone, water-solubility starch, hydroxypropyl methyl cellulose or chitosan.

8. The method for forming optical compensating films as claimed in claim 1, wherein $n_2$ is 20-30, $R_3$ and $R_4$ independently are H or $CH_3$ in the formula (II).

9. The method for forming optical compensating films as claimed in claim 1, wherein $n_2$ is 23, and $R_3$ and $R_4$ are $CH_3$ in the formula (II).

10. The method for forming optical compensating films as claimed in claim 1, further comprising after step (b) adding a surfactant as a softening agent of formula (III) in the suspension

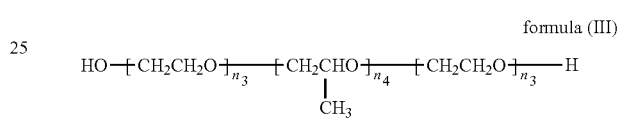

formula (III)

, wherein $n_3$ is 1-200 and $n_4$ is 1-100.

11. The method for forming optical compensating films as claimed in claim 10, wherein $n_3$ is 70-100 and $n_4$ is 20-40 in the formula (III).

12. The method for forming optical compensating films as claimed in claim 10, wherein $n_3$ is 80 and $n_4$ is 27 in the formula (III).

13. The method for forming optical compensating films as claimed in claim 1, further comprising, in the step (d), adding a photoinitiator in the suspension.

14. The method for forming optical compensating films as claimed in claim 1, wherein before the step (g), a Rth value of per μm thickness of the film is greater than 5.

15. The method for forming optical compensating films as claimed in claim 1, wherein in the step (g), a elongation rate of the film is about 10-100%.

16. The method for forming optical compensating films as claimed in claim 1, wherein in the step (g), the out-of-plane Rth value of per μm thickness of the film and the in-of-plane Ro value of the film is increasing when an elongation rate of the film is increasing.

* * * * *